United States Patent [19]

Stanley et al.

[11] 4,395,815
[45] Aug. 2, 1983

[54] METHOD OF MAKING ELECTRIC MACHINES

[75] Inventors: Louis Stanley; Jacqualyne Stanley, both of Beverly Hills, Australia

[73] Assignee: Card-O-Matic Pty. Limited, Waterloo, Australia

[21] Appl. No.: 116,431

[22] Filed: Jan. 29, 1980

[51] Int. Cl.³ .............................................. H02K 15/02
[52] U.S. Cl. ......................................... 29/598; 29/596; 29/605; 29/609; 72/137; 72/168; 310/216
[58] Field of Search ................. 29/596, 598, 605, 609; 310/216, 42; 72/137, 168

[56] References Cited

U.S. PATENT DOCUMENTS

| 356,902 | 2/1887 | Thomson | 29/605 |
|---|---|---|---|
| 3,814,041 | 6/1974 | Redd et al. | 72/137 |
| 4,102,040 | 7/1978 | Rich | 29/598 |

FOREIGN PATENT DOCUMENTS 988568 4/1965 United Kingdom.

Primary Examiner—Carl E. Hall
Attorney, Agent, or Firm—Ladas & Parry

[57] ABSTRACT

An electric machine, such as an induction motor, having a rotor and stator core formed of metal strip coiled about a centrally longitudinal axis extending generally normal to the plane of the strip, and wherein the strip is provided with depressions on longitudinally spaced locations along the length of the strip so as to enable coiling of the strip about the longitudinal axis.

9 Claims, 8 Drawing Figures

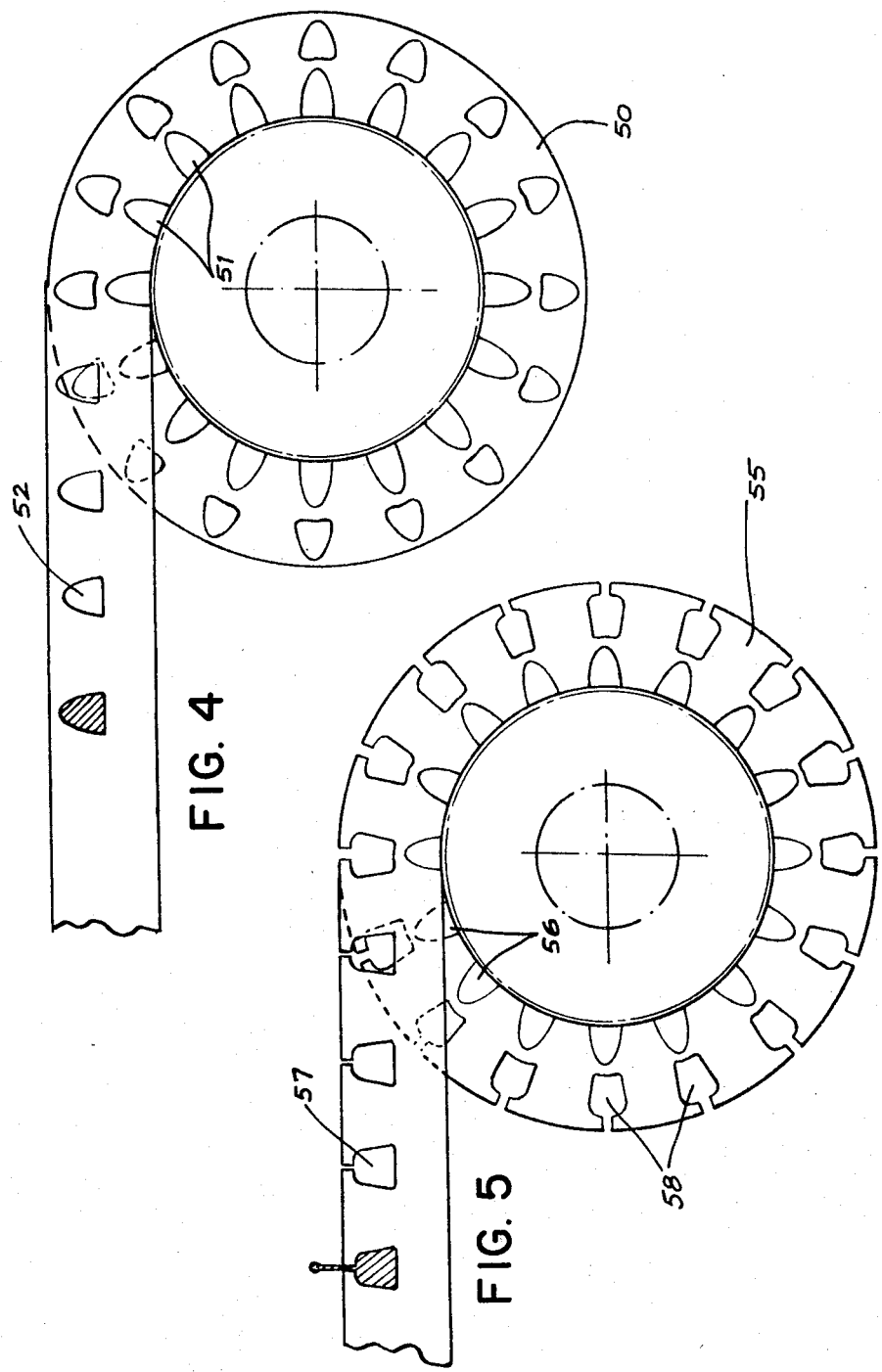

METHOD OF MAKING ELECTRIC MACHINES

The present invention relates to electric machines both rotary as in the case of motors and generators, and stationary as in the case of transformers.

As in the manufacture of electric motors, particularly large induction motors, the rotor for example is formed of a plurality of stacked metal discs held together in most instances by a casting. This and other known methods of manufacture contribute considerably to the cost of the article due to the waste in metal and method of assembly. An example of a conventional rotor is depicted in FIG. 3 of the attached drawings wherein the core of the rotor is formed of a plurality of stacked discs held together by a cast outer casing which has longitudinally extending arms which pass through the discs. There is a corresponding metal waste in the manufacture of stators.

It is an object of the present invention to overcome or substantially ameliorate the above disadvantages.

There is firstly disclosed herein a core for an electric machine, said core being formed of a stacked metal strip coiled about a cenral longitudinal axis which extends generally normal to the plane of the strip, and wherein said strip is deformed at longitudinally spaced locations along the length of the strip so as to enable coiling of the strip about said axis.

There is further disclosed herein a method of forming a core for an electric machine, said method including the steps of:

(a) deforming a metal strip at longitudinally spaced locations along the strip to cause the strip to coil about a longitudinal axis generally normal to the plane of the strip; and (b) stacking the coils of strip.

In the preferred embodiment hereinafter described, the deformations are depressions formed on the radially inner edge of the strip.

It is an advantage of the hereinafter described embodiment that there is very little wasted metal in comparison to convention core constructions.

A preferred form of the present invention will now be described by way of example with reference to the accompanying drawings, wherein:

FIG. 4 is a plan view of a partly formed modified rotor which may be used in the machine of FIG. 1;

FIG. 5 is a plan view of a further partly formed rotor which may be used in a generator;

Figure 1:
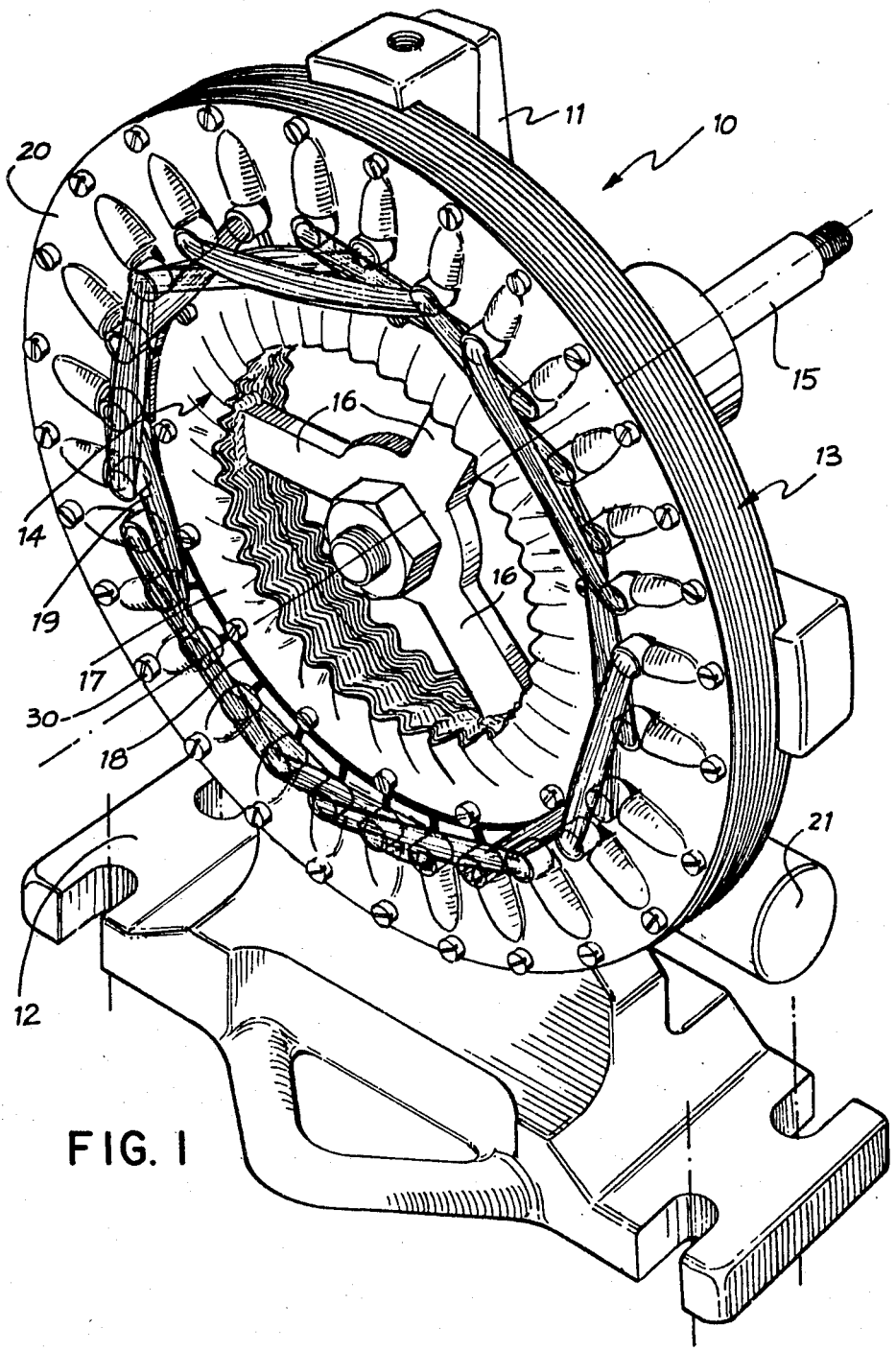
FIG. 1 is a perspective view of an electric induction motor.

The electric machine 10 of FIG. 1 includes a frame 11 attached to a base 12. The frame 11 supports in a fixed position the stator 13 and rotatably supports the rotor 14. The rotor 14 includes a central shaft 15 rotatably supported by a bearing housing 16 of the frame 11. Extending radially outwardly of the shaft 15 are spokes 16 which engage and support the core 17 of the rotor 14. The rotor 14 and stator 13 are separated by an air gap 18. The stator 13 includes field windings 19 and a core 20. The motor 10 is completed by a condenser 21 connected to the field windings in the conventional manner.

Figures 2, 3:
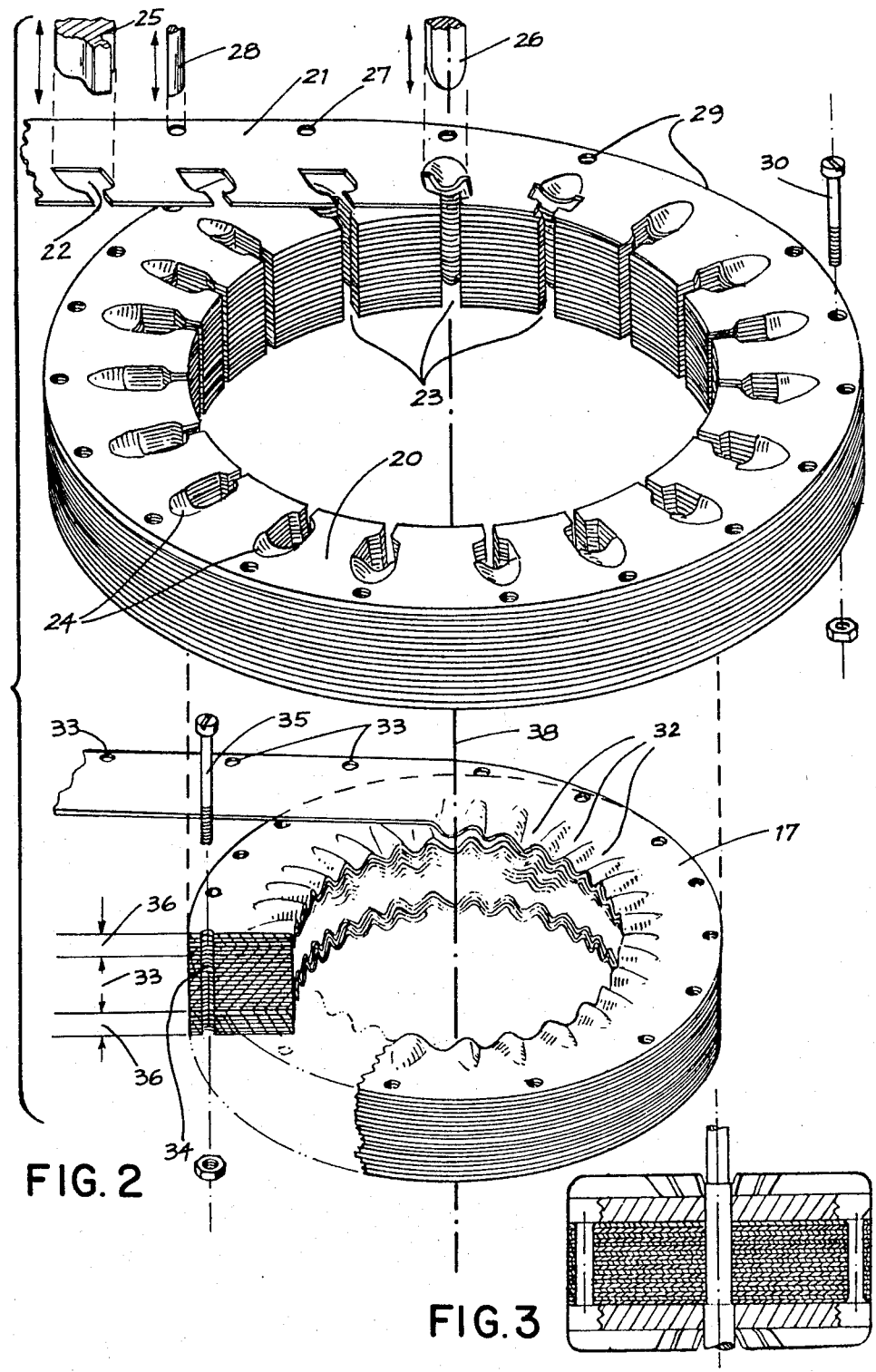
FIG. 2 is a perspective schematic view of the forming of the stator and rotor which may be used in the motor of FIG. 1.
FIG. 3 is a sectioned side elevation of the rotor of the conventional induction rotor.

Now also with reference to FIG. 2, it can be seen that both the rotor core 17 and stator core 20 are formed from stacked metal strip which is coiled to form the generally cylindrically shaped cores 17 and 20. The strip is coiled about an axis extending generally normal to the plane of the strip forming the cores 17 and 20. To achieve this, the strip is crimped at longitudinally spaced locations along the strip so as to have deformed regions which project from the plane of the strip at locations adjacent the radially inner edge of the coiled strip.

The strip 21 used to form the stator core 20 is punched to have apertures 22 which are aligned on the coiled core 20 to form slots 23, additionally the strip 21 is crimped to have cup shaped depressions 24 to enable coiling of the strip 21. The field windings 19 are located within the slots 23. The apertures 22 are formed by punch 25 while the depressions 24 are formed by punch 26. The strip 21 is also formed with apertures 27 by means of punch 28. The apertures 27 are aligned on the core 20 to form passages 29 to receive bolts 30 which hold the coiled strip 21 in position when completely formed. The depressions 24 are aligned on the core 20 and aid in retaining of the strip 21 in position.

The depressions 24 are located at the inner end of the slots 23 so as to extend into the continuous portions of the strip 21 located between the ends of the slots 23 and the radially outer edge of the strip 21. The shape of the depressions 24 is generally cup shaped, however, the width of each depression 24 extending in the direction of the strip is wider adjacent the radially inner edge of the strip 21 in comparison to the width of the depressions 24 adjacent the radially outer edge of the strip 21. To ensure that the core 20 is of a generally cylindrical shape, the depressions 24 must be equally spaced along the strip 21 and must be of the same general shape and depth. To ensure stackability of the separate coils of the strip 21 the depression must be aligned on the core. The radius of the core 20 is determined by the width and depth of the depressions 24 as well as the distance between the depressions 24. The greater the magnitude of the deformations caused by the depressions 24 the smaller the radius of the core 20. Additionally, by decreasing the space between depressions 24, the radius will also be decreased.

The rotor core 17 is formed from the strip 31 which is punched to have depressions 32 adjacent its radially inner edge to enable coiling of the strip 31 about the axis 38. Also punched in the strip 31 are apertures 33 which are aligned on the core 17 to form passages 34 to receive bolts 35 which hold the coiled strip 31 in a coiled position. It would also be advantageous to form the core 17 so as to have two end layers 36 of copper strip and a central layer of steel strip 37. The depressions 32 which enable coiling of the strip are shaped so as to taper towards the radially outer edge of the strips in a similar manner to the depressions 24. The radius of the core 17 is also influenced by the shape and frequency of the depressions 32.

In FIG. 4 a modified rotor core 50 is depicted as partly completed. The core 50 has depressions 51 to again enable coiling about the axis of the core 50 and apertures 52. The apertures being provided to mount the core 50 and for bolts to hold the rotor together.

FIG. 5 provides a further modified rotor core 55 having radially inner depressions 56, again enabling the core 55 to be coiled, and apertures 57 which align on the core 55 to form longitudinally extending slots 58 on the radially outer peripheral surface of the core 55. This rotor 55 is to be used in a generator by locating armature winding in the slots 58.

Figure 6:
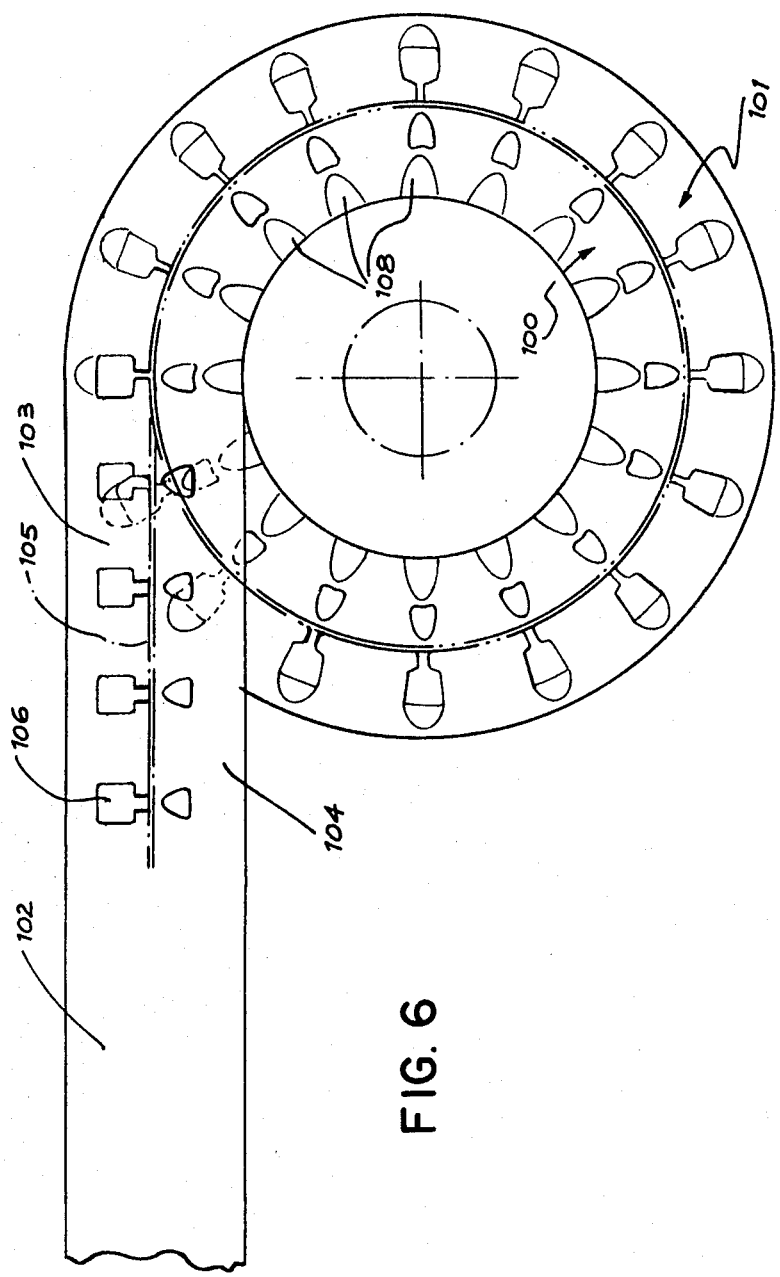
FIG. 6 is a schematic plan view of the simultaneous forming of a rotor and stator.

Now with reference to FIG. 6, there is depicted the simultaneous form of a rotor core 100 and its accompanying stator core 101. Both cores 100 and 101 are formed from the metal strip 102 which is divided into two sub-strips 103 and 104. The strip 102 is divided by penetration of a punch, not depicted, to form the slot 105. Also the apertures 106 are punched to form slots on the radially inner peripheral surface of the core 101 within which the field windings are located. The depressions 107 and 108 are formed in the sub-strips 103 and 104 to again enable coiling of the sub-strips 103 and 104 to form the cores 101 and 100 respectively.

Figure 7:
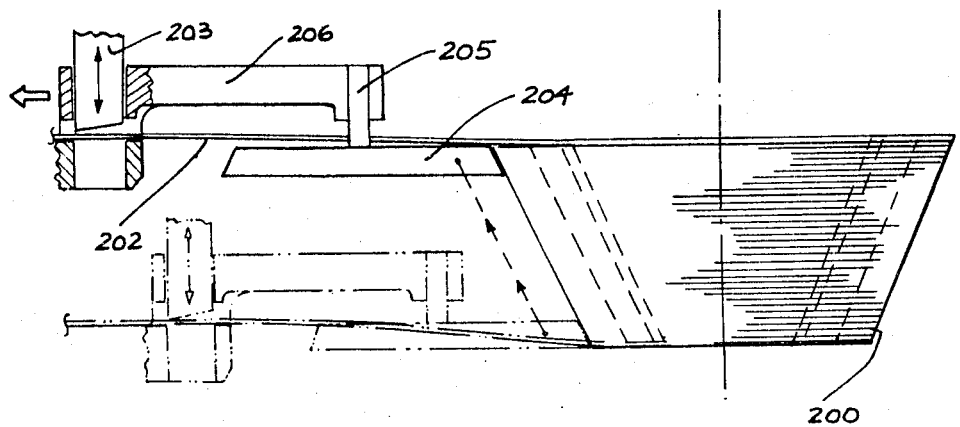
FIG. 7 is a schematic side elevation of the forming of a conical shaped stator.
Figure 8:
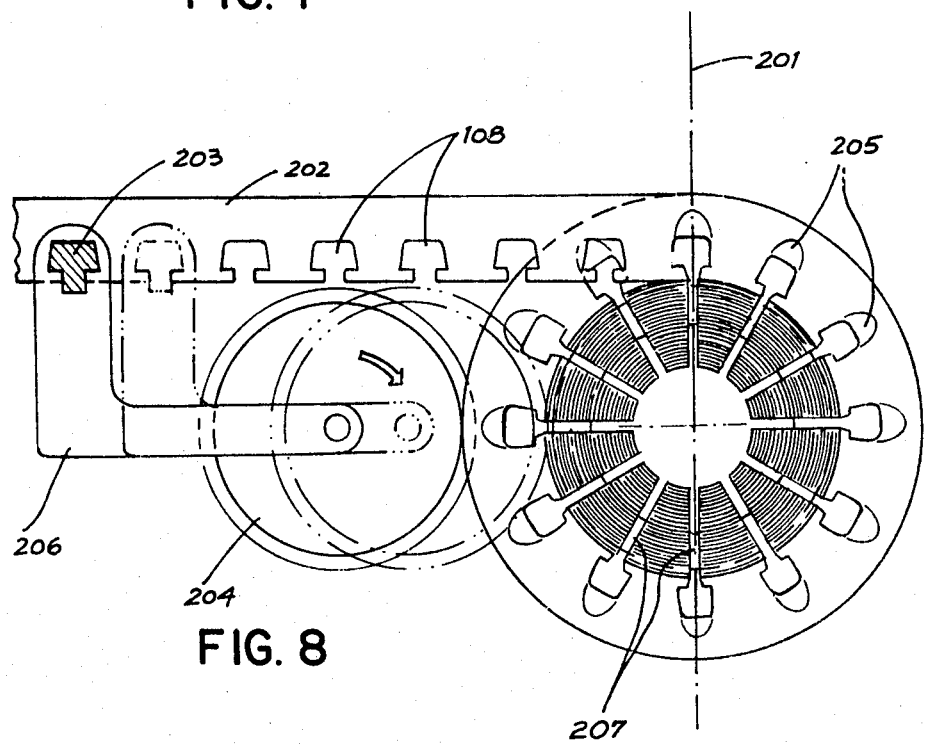
FIG. 8 is a plan view of the stator of FIG. 7.

Now with reference to FIGS. 7 and 8 there is depicted a core 200 being coiled about an axis 201 so as to form a truncated cone defined by the stacked coiling of strip 202 to form a spiral about the axis 201. Again the axis 201 extends generally normal to the strip 202 when coiled on the core 200, however, to enable the formation of a truncated cone, the depressions 205 formed adjacent the radially inner peripheral surface of the core 200 must be spaced from each other by a distance which increases from the smaller radius end of the core 200 to the larger radius end of the core 200. By spaced it is meant that the depressions 205 are spaced longitudinally along the strip 202. Still further, in some instances it is necessary, in order to adjust the bending radius of the strip 202, to vary the depth of the depressions 205 from deep depressions adjacent the smaller radius end of the core 200 to shallower depressions adjacent the larger radius end of the core 200.

In FIG. 7 there is schematically depicted a punch 203 which is moved leftward in order to space apertures 108 formed by the punch 203 at progressively larger intervals along the strip 202 as the diameter of the core 200 increases. The punch 203 is moved leftward by cam 204 engaging the radially outer peripheral surface of the core 200. The cam 204 is rotatably attached to arm 206 by shaft 205. The punch which forms the depressions 205 is not depicted, however, it also would have to move in a leftward direction similar to that of punch 203. As explained in the above paragraph, the depth of the depressions 205 formed would be governed by the travel of the punch which form them.

It should be appreciated that although there is described with reference to FIGS. 7 and 8 a conical rotor, there could simultaneously be formed a stator of complementary shape to thereby provide an air gap between the stator and rotor which is of a greater length in comparison to conventional motors, since the air gap is at an angle to the axis 201 of the core.

Although there is only described above the manufacture of an induction electric motor, it will be appreciated by those skilled in the art that the above technology is also applicable to stationary electric machines such as transformers, as well as other rotary machines such as generators and other non-described electric motors.

Additionally the deformations are only described as depressions, however the deformations could be formed by slots or even by compressing the strip at appropriate intervals to cause the metal of the strip to flow. In this latter instance, the areas subjected to the compressive force would be located toward the radially outer edge of the strip. Despite the various methods of forming the deformations, the above described depressions provide particular advantages in that the strip coils under the strain created in the strip without any other substantial coiling forces. Also the depressions aid in retaining the strip in a coiled position.

It should further be appreciated that the above described cores could be formed of metal wire and thus the term "strip" as used in this specification, including the appended claims, also encompasses the use of wire.

What we claim is:

1. A method of forming a core for an electric machine, said method including the steps of:
    plastically deforming a metal strip by punching depressions therein at longitudinally spaced locations along the strip adjacent an edge thereof to cause the strip to coil about a longitudinal axis generally normal to the plane of the strip with said edge froming the radially inner edge of the strip;
    punching recesses in the strip at spaced locations along the strip so that the recesses align on the coiled core to form longitudinally extending slots on a peripheral surface of the core;
    stacking the coils of strip so that said slots are formed and the depressions are nested; and wherein said depressions are formed to have a width extending in the direction of the strip, which width decreases toward the radially outer edge of the strip.

2. The method of claim 1 wherein said depressions have a depth which decreases from the radially inner edge so as to be generally V-shaped.

3. The method of claim 2 wherein the deformations are equally spaced along the strip so that the core is substantially of cylindrical shape.

4. The method of claim 2 wherein the spaces between the deformations continually increase in length to thereby cause said strip to follow a spiral path and so that said core is formed to have a generally frusto-conical shape.

5. The method of claim 1 wherein the apertures are punched on the radially inner edge of the strip so as to form the slots on the radially inner peripheral surface of the core.

6. The method of claim 1 wherein the apertures are punched on the radially outer peripheral surface of the strip so as to form the slots on the radially outer peripheral surface of the core.

7. A method of manufacturing an electric machine having a stator and a rotor, each comprising a core formed of a stack of coils of a respective metal strip and having a longitudinal axis generally normal to the plane of the strip, the stator being provided with field windings located in longitudinally extending slots on the radially inner peripheral surface of the stator core, said method including the steps of
    A. forming the stator core by
        a. punching apertures in a first said respective metal strip at spaced locations along the strip adjacent an edge thereof,
        b. plastically deforming said first strip by punching depressions in the strip at longitudinally spaced locations therealong correlated with the spaced locations of said apertures and adjacent said edge of the strip to cause the strip to coil about said longitudinal axis with said edge forming the radially inner edge of the strip, said depressions having a width extending in the direction of the strip and decreasing toward the radially outer edge of the strip, and c. stacking the coils of said first strip so that the depressions are nested, the correlation of the spaced locations of said depressions with those of the apertures being such that said apertures align on successive coils to form said longitudinally extending slots on the radially inner peripheral surface of the stack of coils; and B. forming the rotor core by a. plastically deforming a second said respective metal strip by punching depressions in the strip at longitudinally spaced locations therealong adjacent an edge of the strip to cause the strip to coil about said longitudinal axis with said edge forming the radially inner edge of the strip, said depressions having a width extending in the direction of the strip and decreasing toward the radially outer edge of the strip, and b. stacking the coils of said second strip so that the depressions are nested.

8. A method according to claim 7 in which the electric machine to be manufactured is a generator, wherein, in forming the rotor core and prior to punching the depressions in the second strip, apertures are punched at spaced locations along said second strip adjacent the strip edge opposed to that adjacent to which the depressions are to be punched; and wherein the spaced locations at which the depressions are thereafter punched are so correlated with those of said apertures that the apertures will align on successive coils to form longitudinally extending slots on the radially outer peripheral surface of the stack of coils for receiving armature windings.

9. A method according to claim 7 or 8, wherein a single metal strip is divided longitudinally into said first strip and second strip to form said stator core and said rotor core, respectively.

* * * * *